(12) United States Patent
Jang et al.

(10) Patent No.: US 6,308,193 B1
(45) Date of Patent: Oct. 23, 2001

(54) DCT/IDCT PROCESSOR

(75) Inventors: Keun Ho Jang, Ichon-si; Seok Won Choi, Seoul, both of (KR)

(73) Assignee: Hyundai Electronics Ind. Co., Ltd., Ichon-si (KR)

( * ) Notice: Subject to any disclaimer, the term of this patent is extended or adjusted under 35 U.S.C. 154(b) by 0 days.

(21) Appl. No.: 09/241,060

(22) Filed: Feb. 1, 1999

(30) Foreign Application Priority Data

Jan. 30, 1998 (KR) .................................................... 98-2587

(51) Int. Cl.[7] .................................................... G06F 17/14
(52) U.S. Cl. ............................................ 708/401; 708/402
(58) Field of Search .................................. 708/400, 401, 708/402

(56) References Cited

U.S. PATENT DOCUMENTS

| | | | |
|---|---|---|---|
| 5,181,183 | * | 1/1993 | Miyazaki .............................. 708/402 |
| 5,361,220 | * | 11/1994 | Asano .................................. 708/401 |
| 5,471,412 | * | 11/1995 | Shyu ................................... 708/402 |
| 5,701,263 | | 12/1997 | Pineda . |
| 5,831,881 | | 11/1998 | Fledrich et al. . |
| 6,052,703 | * | 4/2000 | Redford ............................... 708/402 |

* cited by examiner

*Primary Examiner*—Chuong Dinh Ngo
(74) *Attorney, Agent, or Firm*—Jacobson Holman, PLLC (57) ABSTRACT

In order to execute a rapid and effective DCT and IDCT and embody DCT and IDCT in one processor, in an inventive DCT/IDCT processor, an input multiplexer selects DCT or IDCT coefficients and transfers the coefficients to a matrix multiplier, and DCT/IDCT deciding unit within the matrix multiplier controls a flow of the DCT and IDCT coefficients. An output multiplexer decides an output of the DCT and the IDCT, to thereby embody the DCT and the IDCT in one processor, and perform the DCT and the IDCT at a high speed by reducing the number of multiplication calculation, namely through a decrease of the calculation number.

10 Claims, 6 Drawing Sheets

| F1 | F3 | F5 | F7 | x OUTPUT |
|---|---|---|---|---|
| A | D | C | B | E |
| B | -B | -A | -C | F |
| C | -A | B | D | G |
| D | -C | D | -A | H |

| F0 | F2 | F4 | F6 | x OUTPUT |
|---|---|---|---|---|
| I | J | I | W | K |
| I | W | -I | -J | L |
| I | -W | -I | J | M |
| I | -J | I | -W | N |

FIG. 7

| f0-f7 | f1-f6 | f2-f5 | f3-f4 | x OUTPUT |
|---|---|---|---|---|
| A | D | C | B | E |
| B | -B | -A | -C | F |
| C | -A | B | D | G |
| D | -C | D | -A | H |

| f0+f7 | f1+f6 | f2+f5 | f3+f4 | x OUTPUT |
|---|---|---|---|---|
| I | I | I | I | K |
| J | W | -W | -J | L |
| I | -I | -I | I | M |
| W | -J | J | -W | N |

DCT/IDCT PROCESSOR

BACKGROUND OF THE INVENTION

1. Field of the Invention

The present invention relates to a DCT/IDCT (Discrete Cosine Transform/Inverse Discrete Cosine Transform) processor as a coding system extensively used in a digital signal process (DSP) field and a voice/image compression system field, and more particularly, to a DCT/IDCT processor capable of improving a DCT/IDCT processing speed and performing a DCT and an IDCT by one processor to thereby enable to embody a very large scale integrated circuit (VLSI).

2. Discussion of Related Art

Generally, in new digital video systems such as a set-top digital cable television box, a direct broadcast satellite (DBS) television, a terrestrial digital television, a digital video disk player (DVDP), a conversational television, a video on demand (VOD) and a video network server, these systems quite depend upon an effective image compression.

The image compression is embodied through a preprocessing step for the sake of an effective process in a succeeding coding, a sub-sampling step for largely lessening the quantity of information, a predicting step by using a spacial correlation among adjacent pixels and a time correlation on a moving image, an orthogonal transform step for reducing the quantity of information by removing a correlation among samples and biasing the distribution for an appearance frequency of sample values, a quantization step for substituting data of successive quantity by discrete values, and an entropy coding step for coding signals gained by the preprocessing into bits of small quantities.

The orthogonal transform is as a transform that the transformed matrix is an orthogonal matrix, wherein the orthogonal matrix is as a matrix that respective rows and columns are orthogonal each other among square matrixes and its respective magnitude is '1'. Such orthogonal matrix has some nature, in which an input signal having a high correlation is changed to a signal having a low correlation. That is, data from a result gained by multiplying this matrix by an input vector becomes a low correlation therein. There also is a characteristic that, in a signal flowchart of a provided orthogonal transform, a signal flowchart for its inverse transform is gotten by inverting an arrow mark of a forward signal flowchart. Such orthogonal transform is used in various fields, e.g., an image process field, especially an image data compression. The orthogonal transform further has a Karhunen-Loeve transform using an inherent value vector, a discrete cosine transform and a Walsh-Hadamard transform (WHT).

The DCT/IDCT requires considerably much process time in a compression and restoration system of real time information, thus through an elevation of such partial performance a systematic performance in an overall-video compression and restoration system can be improved.

The (JPEG Joint Photographic Experts Group) as an international standard group in a digital compression of a still picture containing a gray scale and a color picture recommends four operating modes in supporting various application fields. Among four operating modes a compression algorithm based on the DCT/IDCT is provided as a standard item in a sequential coding more, a progressive coding mode and a hierarchical coding more, excepting a lossless compression.

Figure 1:
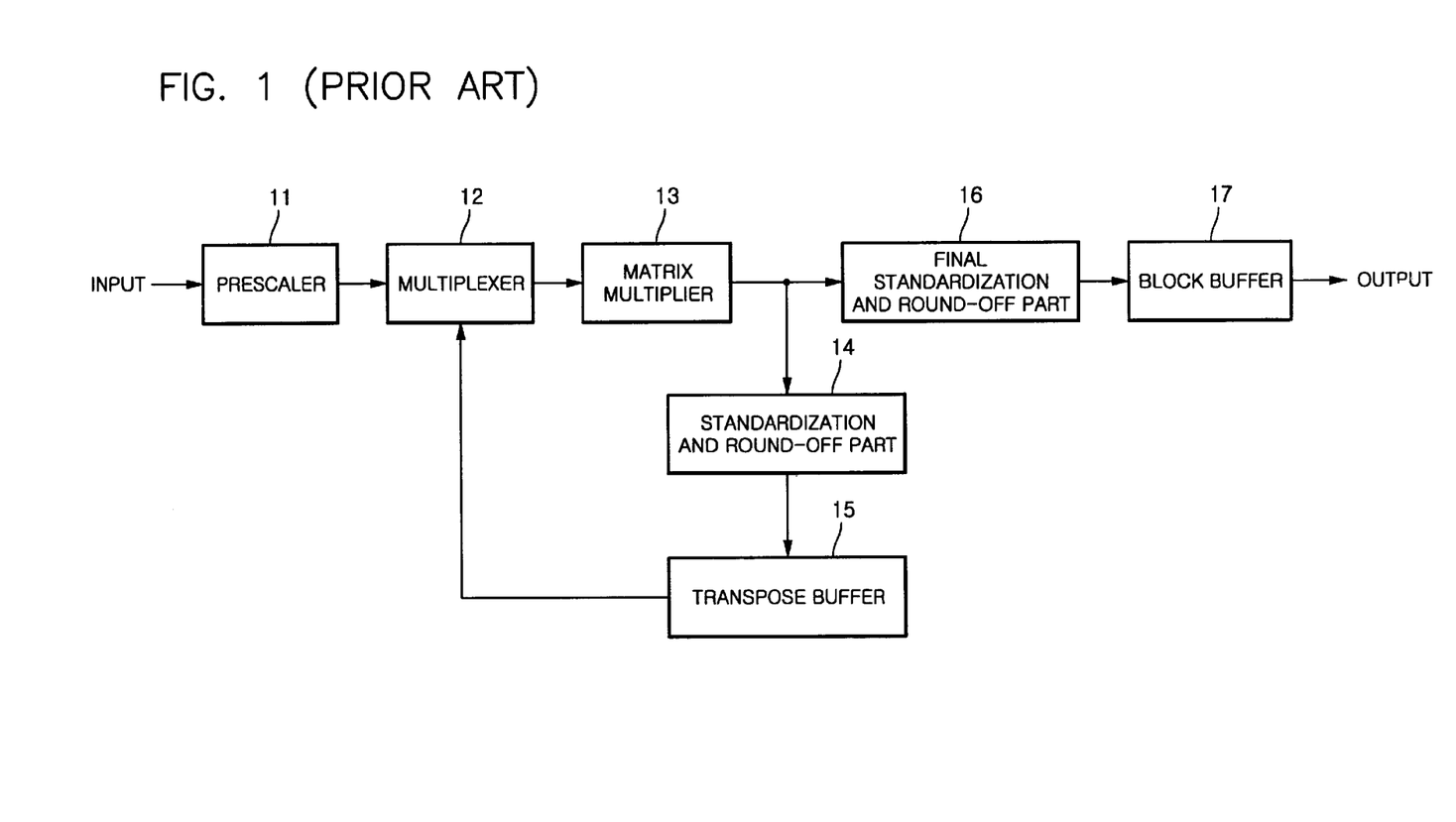
FIG. 1 represents a block diagram of a two dimensional IDCT processor based on a conventional technique.

As shown in FIG. 1, conventionally, a two dimensional IDCT processor in such orthogonal transform, namely the "VLSI executive IDCT processor" provided by U.S. Ser. No. 8/520,044, is composed of a prescaler 11 for inputting DCT coefficients and performing a prescaling therefor: a multiplexer 12 for leading DCT correlation coefficient data prescaled in the prescaler 11 to an inputter of a matrix multiplier 13; the matrix multiplier 13 for multiplying each row of the prescaled DCT correlation coefficient matrix inputted from the multiplexer 12 by an IDCT correlation coefficient matrix; a standardization and round-off part 14 for providing a bit correctness proper to an intermediate output matrix outputted from the matrix multiplier 13; a transpose buffer 15 for transposing the intermediate output matrix scaled and rounded off in the standardization and round-off part 14 to thereby send the matrix to the multiplexer 12; a final standardization and round-off part 16 for providing the bit correctness appropriate for a final output matrix outputted from the matrix multiplier 13; and a block buffer 17 for buffering data gained from the final standardization and round-off part 16 and outputting final IDCT data.

Figure 2:
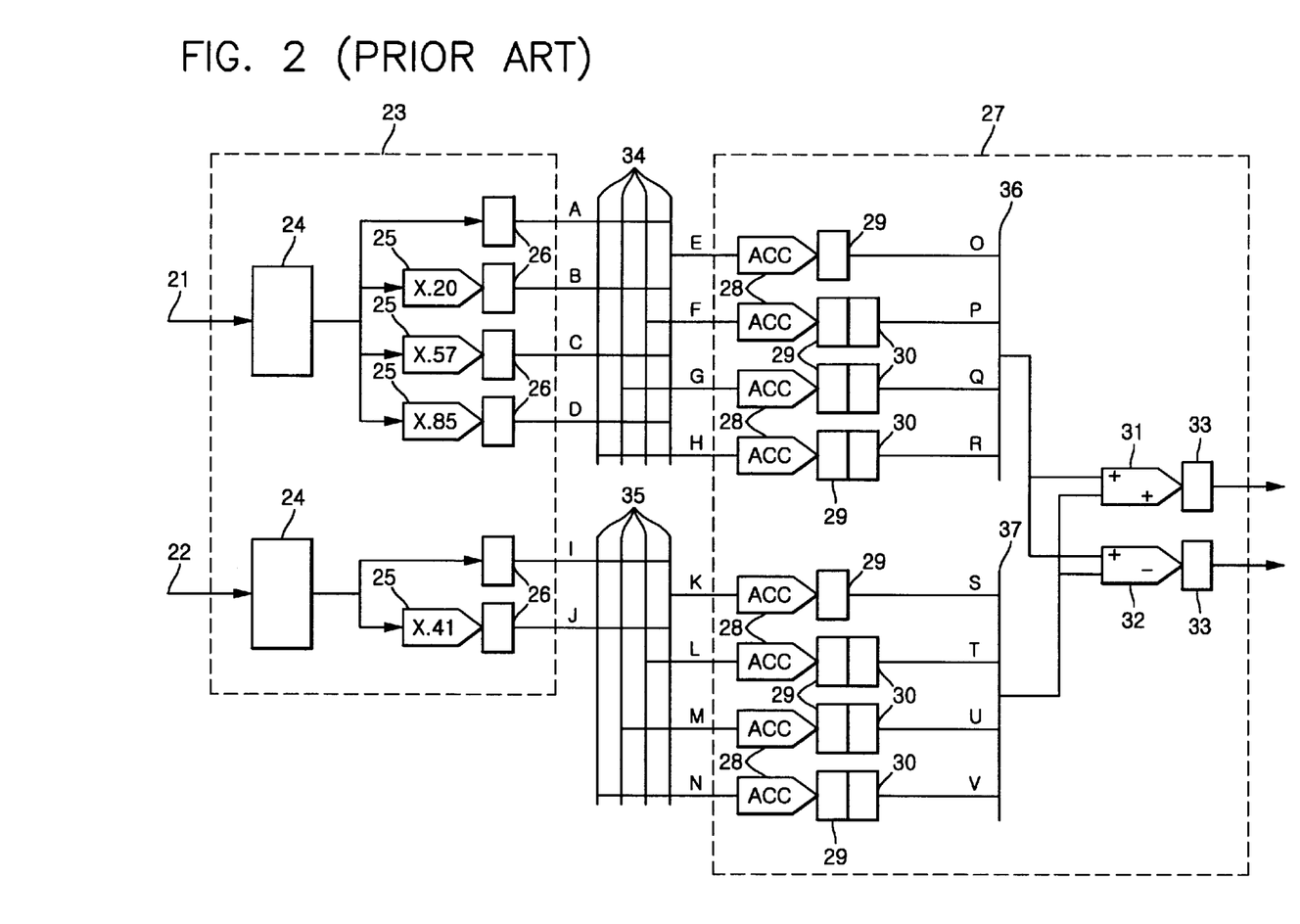
FIG. 2 sets forth a detailed block diagram of a matrix multiplier in the two dimensional IDCT processor of FIG. 1.

The matrix multiplier 13, as shown in FIG. 2, includes a vector multiplier 23 having a plurality of registers 24, 26 and a fixed positional multiplier 25, for executing a vector multiplication; and an accumulator 27 having numerous registers 29, 30, 33, an accumulating unit 28, an addition unit 31 and a deduction unit 32, for accumulating data.

In reference numbers of FIG. 2, 21 is a data path of an odd channel, 22 is a data path of an even channel, 34 and 35 are crossbar switches for performing an interface between the vector multiplier 23 and the accumulator 27, and 36 and 37 are multiplexers for executing an interface among the accumulating unit 28, the addition unit 31 and the deduction unit 32.

Operations of the two dimensional IDCT processor based on the conventional technique under such construction are described in detail referring to the accompanied diagrams, as follows.

In an image compressing technique based on the DCT, the DCT is done by using, as a unit, a block constructed from 64 pixel samples of '8×8' for data inputted to an encoder. Then a decoder reconstructs it as original image information through an IDCT to thereby gain a reproduction image of '8×8'.

In order to get the above-mentioned result, the prescaler 11 receives the DCT coefficients to then perform the prescaling and sends the coefficients to the multiplexer 12, and the multiplexer 12 inducts the prescaled DCT correlation coefficient data to the inputter of the matrix multiplier 13.

The vector multiplier 23 of the matrix multiplier 13 multiplies each row of the prescaled DCT correlation coefficient matrix inputted from the multiplexer 12 by the IDCT correlation coefficient matrix, and the accumulator 27 thereof stores its matrix data.

The standardization and round-off part 14 provides the bit correctness proper to the intermediate output matrix outputted from the matrix multiplier 13, and the transpose buffer 15 transposes the intermediate output matrix scaled and rounded off in the standardization and round-off part 14 to thereby send the matrix to the multiplexer 12. The matrix multiplier 13 again multiplies each row of the DCT correlation coefficient matrix by the IDCT correlation coefficient matrix and stores the matrix from its result.

The final standardization and round-off part 16 provides the adequate bit correctness for the final output matrix outputted from the matrix multiplier 13, and then the block buffer 17 outputs the DCT coefficients.

This IDCT processor is optimized so as to be used within an MPEG-2 decoder, in other words, the IDCT processor operates on MPEG data based on an 8×8 block. The IDCT processor carries out a procedure of a rapid two-dimensional eight-points IDCT calculation, and an input matrix of the two dimensional DCT coefficients is prescaled. This prescaled matrix is applied to the matrix multiplier 13 in which specific two-dimensional IDCT correlation coefficient matrixes are multiplied by a row-to-row system, so as to accumulate the intermediate output matrixes. Such intermediate output matrixes are applied to a transpose memory having transpose values of the output matrixes. Then, the matrix multiplier 13 multiplies the specific two-dimensional output matrix by a transposed output matrix in the row-to-row system, and accumulates its result matrixes. The specific two-dimensional correlation coefficient matrix and the prescaled correlation coefficients are selected so that its result matrix is approximate to the IDCT of input DCT correlation coefficients and the two-dimensional correlation coefficient matrix contains only five specific values any one of which is '1'.

As afore-mentioned, many DCT/IDCT operations are followed in the MPEG encoder and decoder used in the encoder of the digital video system and the decoder of a receiving apparatus. For example, in case an image frame is displayed 30 frames/sec in an MPEG (Moving Picture Experts Group) 2, one ASIC is available to be embodied when the DCT in the encoder is only performed at a speed of '1920×1080×(6/4)×30=93.312 MPixel/sec'. Further, it should be equipped the IDCT processor in the decoder in order to reproduce original image data.

Meanwhile, the DCT and IDCT processors applied to such conventional MPEG encoder and decoder have a mutual similar structure, and there is in an image transmitting/receiving system a shortcoming that the DCT and IDCT processors having the similar structure should be respectively installed in the encoder and the decoder. In such case, a size of the system becomes also relatively large due to an installment of two processors.

SUMMARY OF THE INVENTION

Accordingly, the present invention is directed to a DCT/IDCT processor that substantially obviate one or more of the limitations and disadvantages of the related art.

An object of the present invention is to provide a DCT/IDCT processor capable of embodying a very large scale integrated circuit (VLSI) by improving a process speed of a DCT and IDCT and by performing a DCT and an IDCT in one processor.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, in a DCT/IDCT processor, an IDCT processor having a standardization and round-off part for standardizing and rounding off discrete cosine transformed matrix data, a transpose buffer for transposing the matrix data outputted from the standardization and round-off part, and a final standardization and round-off part for standardizing and rounding off a finally inverse-discrete cosine transformed matrix data, consists of: a first multiplexer for selecting and outputting one out of the above-mentioned matrix data and the matrix data transposed by the transpose buffer; a first pre/post scaler for prescaling or postscaling the matrix data outputted from the first multiplexer; a second multiplexer for selecting one out of a DCT coefficient and an IDCT coefficient according to an external signal deciding a DCT or an IDCT and outputting it as matrix data; a matrix multiplier for multiplying the matrix data provided from the second multiplexer by the DCT or IDCT correlation coefficient selectively, accumulating its result matrixes, and controlling a path of discrete cosine transformed or inverse discrete cosine transformed matrix data in response to the external signal deciding the DCT or the IDCT; a second pre/post scaler for prescaling or postscaling the matrix data outputted from the matrix multiplier, and transferring the data to the second multiplexer; and an output path deciding part for deciding a final output path of the matrix data outputted from the matrix multiplier.

In one embodiment of the present invention, the IDCT is performed by factorizing a standard IDCT expression into two factors so as to be converted, prescaling each input data and multiplying the data by a specially selected matrix. The prescaling is selected so that the specially selected matrix may have specific values by a restricted number. That is, the inventive IDCT processor may have an improved IDCT processing speed by reducing the number of calculation and may also ensure a correctness by lessening the number of fixed-point multiplication calculation.

In another embodiment of the present invention, the DCT is performed through procedures of factorizing a standard DCT expression into two factors so as to be converted, multiplying the data by a specially selected matrix, postscaling its result, and executing the DCT. The DCT processor may have an improved DCT processing speed by reducing the number of calculation and may also ensure a correctness by lessening the number of fixed-point multiplication calculation.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENT

Reference will now be made in detail to the preferred embodiments of the present invention, examples of which are illustrated in the accompanying drawings.

Figure 3:
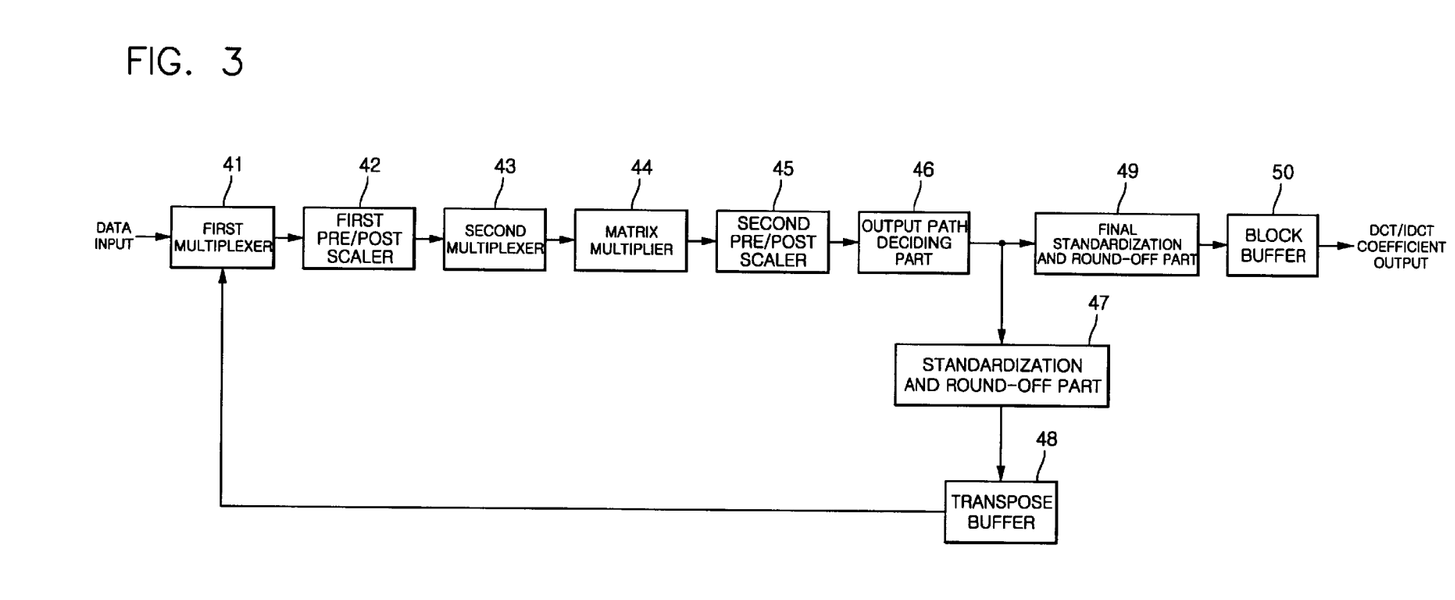
FIG. 3 illustrates a detailed block diagram of a two dimensional DCT/IDCT processor in accordance with the present invention.

As shown in FIG. 3, in an inventive DCT/IDCT processor, an IDCT processor is composed of a first multiplexer 41 for selecting and outputting one out of matrix data and matrix data transposed by a transpose buffer 48; a first pre/post scaler 42 for prescaling or postscaling the matrix data outputted from the first multiplexer 41; a second multiplexer 43 for selecting one out of a DCT coefficient and an IDCT coefficient in response to an external signal deciding a DCT or an IDCT and outputting it as matrix data; a matrix multiplier 44 for multiplying the matrix data provided from the second multiplexer 43 by a DCT or IDCT correlation coefficient selectively, accumulating its result matrixes, and controlling a path of discrete cosine transformed or inverse discrete cosine transformed matrix data in response to the external signal deciding the DCT or the IDCT; a second pre/post scaler 45 for prescaling or postscaling the matrix data outputted from the matrix multiplier 44, and transferring the data to the second multiplexor 43; an output path deciding part 46 for deciding a final output path of the matrix data outputted from the matrix multiplier 44; a standardization and round-off part 47 for providing a bit correctness proper to an intermediate output matrix outputted from the output path deciding part 46; a transpose buffer 48 for transposing the intermediate output matrix scaled and rounded off in the standardization and round-off part 47 to thereby send the matrix to the first multiplexer 41; a final standardization and round-off part 49 for providing the bit correctness appropriate for a final output matrix outputted from the output path deciding part 46; and a block buffer 50 for buffering data gained from the final standardization and round-off part 49 and outputting the DCT coefficients or the IDCT coefficients.

The second pre/post scaler 45 is made up of first and second matrix selecting scalers 45-1, 45-2, for selecting one out of the DCT matrix data outputted from the matrix multiplier 44 and the IDCT matrix data inputted to other inputter and prescaling or postscaling the selected matrix data.

The first matrix selecting scaler 45-1 also includes a multiplexer 45-1a for selecting one out of the DCT matrix data outputted from a first DCT/IDCT deciding unit 65 and the IDCT matrix data inputted to other inputter, the first DCT/IDCT deciding unit 65 being positioned within the matrix multiplier 44 ; a pre/post scaler 45-1b for prescaling or postscaling the output matrix from the multiplexer 45-1a; and a demuiltiplexer 45-1c for demultiplexing the matrix data outputted from the pre/post scaler 45-1b.

The second matrix selecting scaler 45-2 consists of a multiplexer 45-2a for selecting one out of the DCT matrix data outputted from a second DCT/IDCT deciding unit 66 and the IDCT matrix data inputted to other inputter, the second DCT/IDCT deciding unit 66 being positioned within the matrix multiplier 44; a pre/post scaler 45-2b for prescaling or postscaling the output matrix from the multiplexer 45-2a; and a demultiplexer 45-2c for demultiplexing and outputting the matrix data outputted from the pre/post scaler 45-2b.

Figure 4:
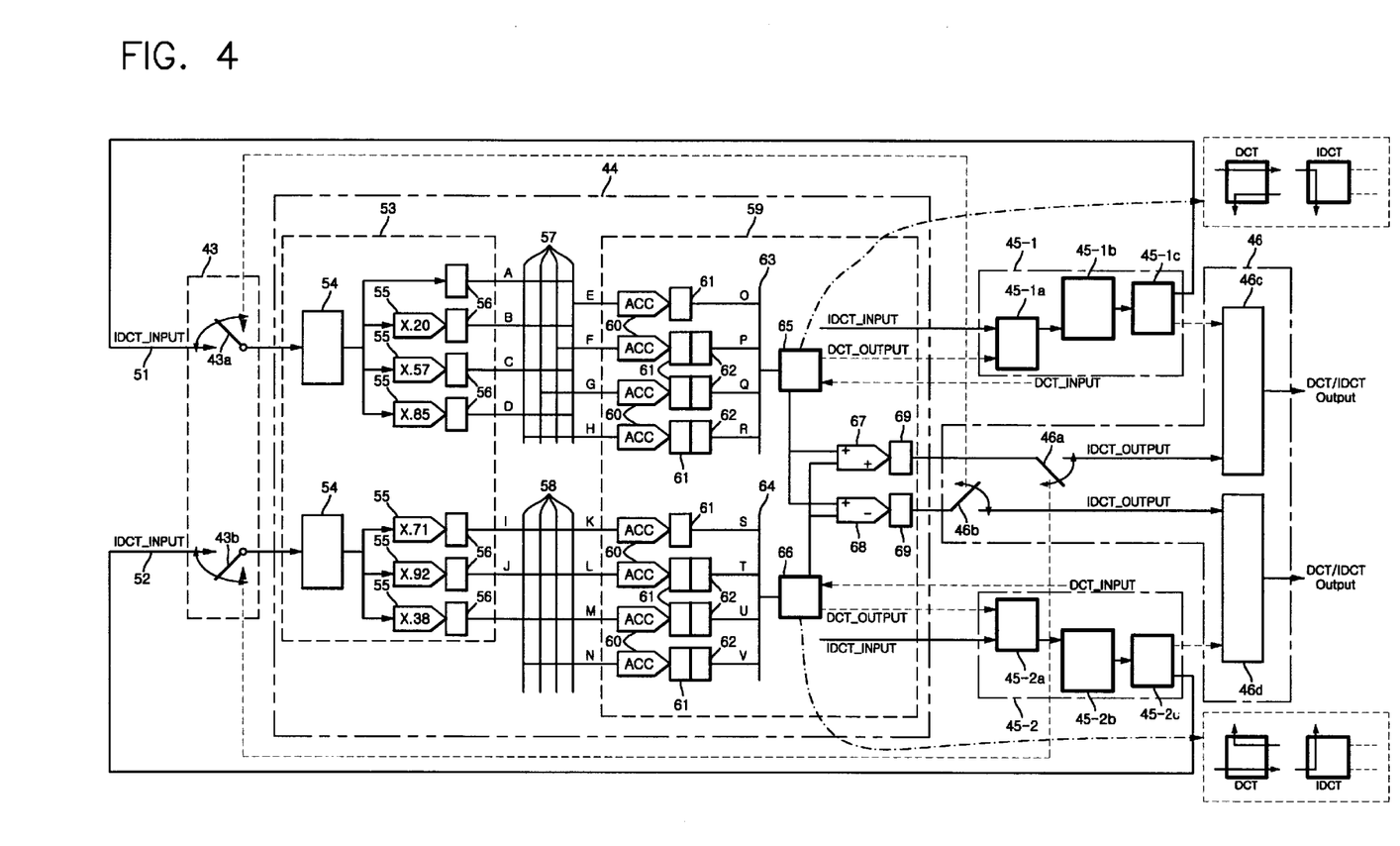
FIG. 4 shows a detailed block diagram of a matrix multiplier applied to the two dimensional DCT/IDCT processor of FIG. 3.

As shown in FIG. 4, the matrix multiplier 44 consists of a vector multiplier 53 having a plurality of registers 54, 56 and a fixed positional multiplier 55, for executing a vector multiplication, an accumulator 59 for accumulating matrixes outputted from the vector multiplier 53; and crossbar switches 57, 58 placed between the vector multiplier 53 and the accumulator 59, for performing an interface between the vector multiplier 53 and the accumulator 59.

The accumulator 59 includes an accumulating unit 60, a number of registers 61, 62, 69, multiplexers 63, 64 for multiplexing output data from a number of registers 61, 62, DCT/IDCT deciding units 65, 66 for controlling a path between an output from the multiplexers 63, 64 and the DCT coefficins inputted from the outside, and addition and deduction units 67, 68 for selectively adding up and deducting output signals from the DCT/IDCT deciding units 65, 66. In non-described reference numbers of FIG. 4, 51 is a data path of an odd channel, and 52 is a data path of an even channel.

The DCT/IDCT deciding units 65, 66 output the DCT coefficients provided from the accumulating unit 60 in case the DCT signal is not inputted thereto, and in case the DCT signal is inputted from the outside, the DCT/IDCT deciding units 65, 66 transmit its inputted DCT_INPUT coefficients to each of the addition unit 67 and the deduction unit 68.

The DCT/IDCT deciding units 65, 66 transmit the IDCT coefficients to each of the addition unit 67 and the deduction unit 68 so as to output inverse discrete cosine transformed data IDCT_OUTPUT, when the IDCT coefficients are outputted from the accumulating unit 60.

Figure 5:
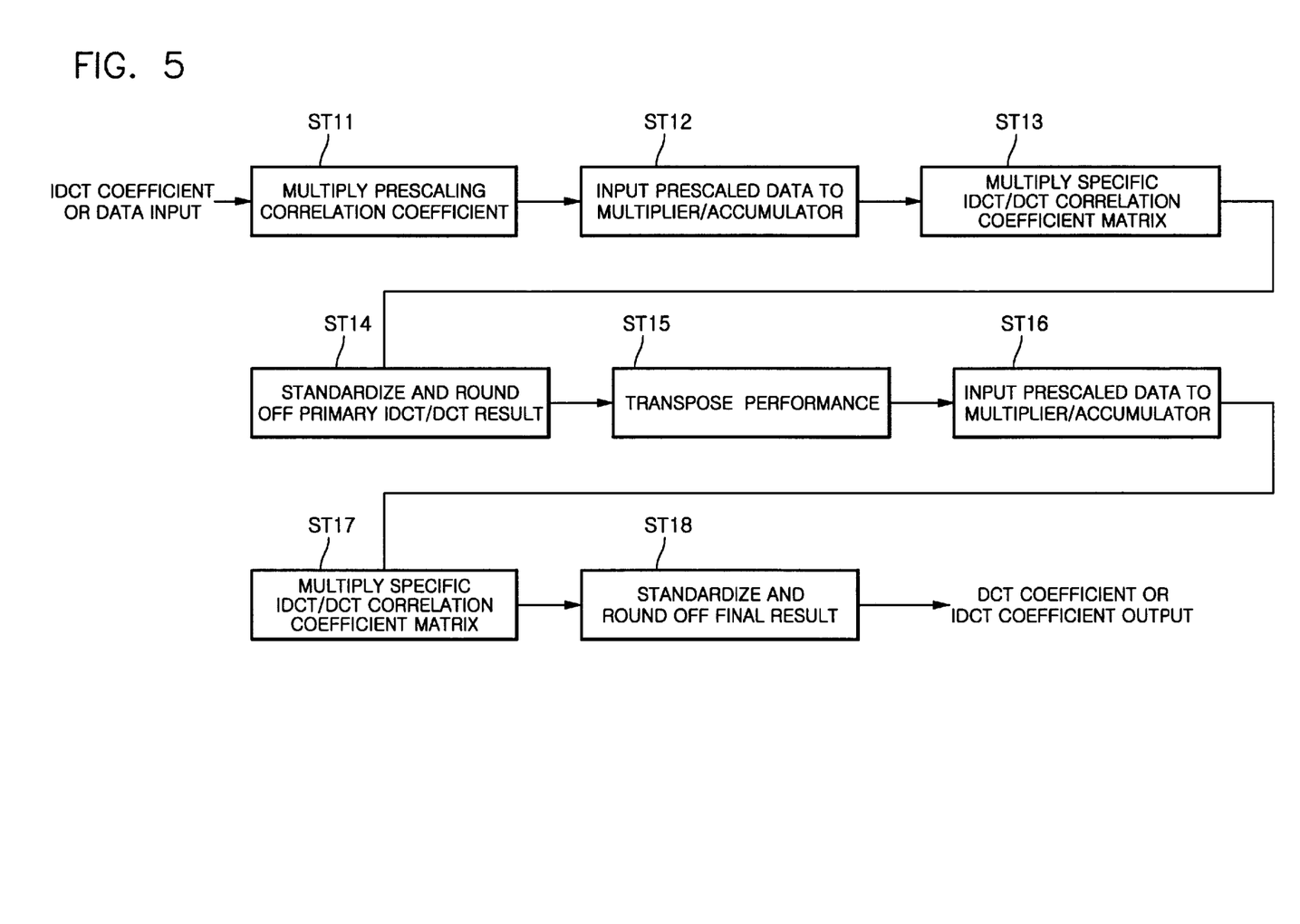
FIG. 5 presents a flow chart showing a DCT/IDCT performance procedure in the present invention.

As shown in FIG. 5, the inventive DCT/IDCT processor operates through the steps of: inputting IDCT coefficients or data and multiplying it by prescaling correlation coefficients, in a step ST11; inputting the prescaled data to the vector multiplier 53 and the accumulator 59 in a step ST12; multiplying the inputted prescaled data by a specific IDCT or DCT correlation matrix in a step ST13; standardizing primary IDCT or DCT result values obtained in the step ST13 and performing a round-off process, in a step ST14; executing a transposition for the data and re-inputting the transposed data to the vector multiplier 53 and the accumulator 59, in a step ST16; again multiplying the re-inputted matrix by the specific IDCT or DCT correlation coefficient matrix, in a step ST17; and standardizing and rounding off a final result matrix provided in the step ST17 and outputting DCT coefficients or IDCT coefficients, in a step ST18.

A Such operations of the DCT/IDCT processor are described in detail referring to FIGS. 3 to 7, as follows.

In one embodiment of the inventive IDCT processor, an IDCT calculation for input DCT correlation coefficient data is performed through two steps, namely, in a first step, the input DCT correlation coefficient is multiplied by a prescaling factor changeable according to a position of a correlation coefficient, wherein the prescaling factor is periodically changed according to some position with a given vector. In a second step thereof, the prescaled input DCT correlation coefficient is multiplied by an IDCT correlation coefficient matrix.

In the DCT processor as another embodiment, DCT calculation for input IDCT correlation coefficient data and pixel samples of '8×8=64' is executed by multiplying the input IDCT correlation coefficient data, the 64 pixels sample data of '8×8' and the IDCT correlation coefficient matrix, through one step.

The prescaling factor and the IDCT correlation coefficient matrix herein are selected in order to ensure a correct result, simplify a multiplication hardware and reduce the number of calculation, and also so as to become the DCT/IDCT correlation coefficient matrix capable of being simultaneously used together with the DCT processor.

The DCT/IDCT processor based on one aspect of the present invention is optimized so as to be employed in an MPEG-2 encoder and decoder.

The standard expression of such two-dimensional DCT and IDCT may be represented as the following numerical expressions 1 and 2.

$$DCT: F_{u,v} = \frac{1}{4}C_u C_V \sum_{x=0}^{7} \cos\frac{\pi(2x+1)u}{16}$$ [Numerical Expression 1]

$$\sum_{y=0}^{7} \cos\frac{\pi(2v+1)v}{16} f_{x,y}$$

$$IDCT: F_{x,y} = \frac{1}{4}\sum_{u=0}^{7} C_u \cos\frac{\pi(2x+1)u}{16}$$ [Numerical Expression 2]

$$\sum_{v=0}^{7} C_v \cos\frac{\pi(2y+1)v}{16} f_{u,v}$$

$$C_u, C_v = \begin{bmatrix} 1/\sqrt{2} & \text{for } u,v = 0 \\ 1 & \text{otherwise} \end{bmatrix}$$

The above numerical expression 1 indicates the standard expression of the DCT, and the numerical expression 2 shows the standard expression of the IDCT. For example with the numerical expression 1, a conversion correlation coefficient in the correlation coefficient is gained by performing a factorization as shown in the following expressions 3 through 5.

$$C_u \cos\pi(2x+1)\frac{u}{16} = P_u T_{x,u}$$ [Numerical Expression 3]

$$P_u = \begin{matrix} 0.71 & \text{for } u = 0,4 \\ 0.98 & \text{for } u = 1,3,5,7 \\ 0.92 & \text{for } u = 2 \\ 0.38 & \text{for } u = 6 \end{matrix}$$ [Numerical Expression 4]

$$T_{X,U} = \frac{C_u \cos\pi(2x+1)\frac{u}{16}}{P_u}$$ [Numerical Expression 5]

The following [table 1] shows values of $P_U$ from the numerical expression 4.

TABLE 1

| u | 0 | 1 | 2 | 3 | 4 | 5 | 6 | 7 |
|---|---|---|---|---|---|---|---|---|
| $P_U$ | .71 | .98 | .92 | .98 | .71 | .98 | .92 | .98 |

The following [table 2] provides values of $T_{X,U}P_U$, and [table 3] represents values of $T_{X,U}$. The values shown in the tables 1 to 3 are rounded off for the sake of a simple explanation, thus in an actual specific performance, a re-calculation should be done on the basis of the provided expressions.

TABLE 2

| $T_{X,U}P_U$ | | | | U | | | | |
|---|---|---|---|---|---|---|---|---|
| X | 0 | 1 | 2 | 3 | 4 | 5 | 6 | 7 |
| 0 | .71 | .98 | .92 | .83 | .71 | .56 | .38 | .20 |
| 1 | .71 | .83 | .38 | −.20 | −.71 | −.98 | −.92 | −.56 |
| 2 | .71 | .56 | −.38 | −.98 | −.71 | .20 | .92 | .83 |
| 3 | .71 | .20 | −.92 | −.56 | .71 | .83 | −.38 | −.98 |
| 4 | .71 | −.20 | −.92 | .56 | .71 | −.83 | −.38 | .98 |
| 5 | .71 | −.56 | −.38 | .98 | −.71 | −.20 | .92 | −.83 |
| 6 | .71 | −.83 | .38 | .20 | −.71 | .98 | −.92 | .56 |
| 7 | .71 | −.98 | .92 | −.83 | .71 | −.56 | .38 | −.20 |

TABLE 3

| $T_{X,U}$ | | | | U | | | | |
|---|---|---|---|---|---|---|---|---|
| X | 0 | 1 | 2 | 3 | 4 | 5 | 6 | 7 |
| 0 | 1.00 | 1.00 | 1.00 | .85 | 1.00 | .57 | .41 | .20 |
| 1 | 1.00 | .85 | .41 | −.20 | −1.00 | −1.00 | −1.00 | −.57 |
| 2 | 1.00 | .57 | −.41 | −1.00 | −1.00 | .20 | 1.00 | .85 |
| 3 | 1.00 | .20 | −1.00 | −.57 | 1.00 | .85 | −.41 | −1.0 |
| 4 | 1.00 | −.20 | −1.00 | .57 | 1.00 | −.85 | −.41 | 1.00 |
| 5 | 1.00 | −.57 | −.41 | 1.00 | −1.00 | −.20 | 1.00 | −.85 |
| 6 | 1.00 | −.85 | .41 | .20 | −1.00 | −1.00 | −1.00 | .57 |
| 7 | 1.00 | −1.00 | 1.00 | −.85 | 1.00 | −.57 | .41 | −.20 |

Therefore, the two dimensional IDCT is converted as follows, in applying $T_{X,U}$ and $P_U$ to the numerical expression 1.

$$f_{x,y} = \frac{1}{4}\sum_{u=0}^{7} T_{x,u} \sum_{y=0}^{7} T_{y,v} F'_{u,v}$$ [Numerical Expression 6]

$$F'_{u,v} = P_u P_v F_{u,v}$$ [Numerical Expression 7]

$P_U$, $P_V$ in the invention are separated in a conversion of the IDCT performance and can be performed as a prescaling of an input sample. There can be obtained the most high advantage in the MPEG encoder/decoder in case that such prescaling is executed in quantization and inverse quantization procedures simultaneously. In case the symmetry for the correlation coefficient matrix of $T_{X,U}$ is utilized in the invention, a simplification can be more gained.

The following [table 4] provides that [table 3] is classified into the odd part and the even part concerning of u.

TABLE 4

| $T_{X,U}$ | u (even number) | | | | u (odd number) | | | |
|---|---|---|---|---|---|---|---|---|
| X | 0 | 2 | 4 | 6 | 1 | 3 | 5 | 7 |
| 0 | 1.00 | 1.00 | 1.00 | .41 | 1.00 | .85 | .57 | .20 |
| 1 | 1.00 | .41 | −1.00 | −1.00 | .85 | −.20 | −1.00 | −.57 |
| 2 | 1.00 | −.41 | −1.00 | 1.00 | .57 | −1.00 | .20 | .85 |
| 3 | 1.00 | −1.00 | 1.00 | −.41 | .20 | −.57 | .85 | −1.0 |
| 4 | 1.00 | −1.00 | 1.00 | −.41 | −.20 | .57 | −.85 | 1.00 |
| 5 | 1.00 | −.41 | −1.00 | 1.00 | −.57 | 1.00 | −.20 | −.85 |
| 6 | 1.00 | .41 | −1.00 | −1.00 | −.85 | .20 | 1.00 | .57 |
| 7 | 1.00 | 1.00 | 1.00 | .41 | −1.00 | −.85 | −.57 | −.20 |

Herein, in Tx,u for a case that u is an even number, its values are symmetrical between 'x=0,1,2,3' and 'x=4,5,6,7' each other. In values of Tx,u for a case that u is an odd number, its codes between 'x=0,1,2,3' and 'x=4,5,6,7' are opposite to each other under a symmetrical structure, namely there is formed an asymmetrical structure. In such symmetrical structure, a multiplication result can be applied from an upper part of a matrix to a bottom thereof, thus it can be replaced a procedure of an addition from a procedure of the multiplication.

It is also desirable that a matrix sum for 'x=0,1,2,3' is computed for the u values of the even number and the odd number separately, and then values for x are properly combined and added to whereby get the matrix sum for all x's. In embodying the DCT/IDCT in the same ASIC, it can be available only by performing an adequate combination about x's and calculating the matrix sum appropriate for each case.

Further, if a single dimension is considered and a multiplication of 1/4 is disregarded, in the matrix sum by the two-dimensional IDCT processor, it can be represented as the following numerical expression 8.

$$f_x = \begin{aligned} &\sum_{u=0,2,4,6} T_{x,u} F'u + \\ &\sum_{u=1,3,5,7} T_{x,u} F'u \\ &\sum_{u=0,2,4,6} T_{7-x,u} F'u - \\ &\sum_{u=1,3,5,7} T_{7-x,U} F'u \end{aligned} \quad \begin{array}{l} \text{for } x = 0, 1, 2, 3 \\ \\ \text{for } x = 4, 5, 6, 7 \end{array}$$ [Numerical Expression 8]

In such calculation procedure, there can be presented an effective structure demanding only eighteen multiplications and forty additions for every eight output samples.

Such matrix can be applied to the DCT performance, under only a difference in its order as shown in the following.

$$F_X = F'_X * P'_X$$ [Numerical Expression 9]

$$F'_x = \begin{aligned} &\sum_{u=0,1,2,3} (f_u + f_{7-u}) T'_{x,u} \quad \text{for } x = 0, 2, 4, 6 = F'_x * P'_x \\ &\sum_{U=0,1,2,3} (f_u - f_{7-u}) T'_{x,u} \quad \text{for } x = 1, 3, 5, 7 \end{aligned}$$

[Table 5] shows values of P'$_x$ gained from the numerical expression 9.

TABLE 5

| u | 0 | 1 | 2 | 3 | 4 | 5 | 6 | 7 |
|---|---|---|---|---|---|---|---|---|
| P¹$_x$ | .71 | .98 | .92 | .98 | .71 | .98 | .92 | .98 |

[Table 6] represents values of T'$_{x,u}$ gained from the numerical expression 9 in a case of 'u=0,1,2,3'.

TABLE 6

| T¹$_{x,u}$ | u | | | |
|---|---|---|---|---|
| x | 0 | 1 | 2 | 3 |
| 0 | 1.00 | 1.00 | 1.00 | 1.00 |
| 2 | 1.00 | .41 | .41 | -1.00 |
| 4 | 1.00 | -1.00 | -1.00 | 1.00 |
| 6 | .41 | -1.00 | 1.00 | -.41 |
| 1 | 1.00 | .85 | .57 | .20 |
| 3 | .85 | -.20 | -1.00 | -.57 |
| 5 | .57 | -1.00 | .20 | .58 |
| 7 | .20 | -.57 | .85 | -1.00 |

The IDCT coefficient processing procedure in the DCT/IDCT processor is described as follows.

The first multiplexer 41 selects one out of the DCT coefficient and the IDCT coefficient inputted according to the external signal deciding the DCT or IDCT, and transfers it to the pre/post scaler 42. Namely under such IDCT process procedure, the DCT matrix data is selected and transmitted to the pre/post scaler 42. Also, though it is not shown in the drawings, the external signal needs in deciding whether a corresponding logic will operate by a DCT mode or an IDCT mode, in order to actually embody the DCT/IDCT in one ASIC.

The pre/post scaler 42 multiplies the transferred DCT coefficient by a prescaling correlation coefficient in the step ST11, and its prescaled DCT matrix data is inputted to the second multiplexer 43, and the second multiplexer 43 selects the inputted DCT matrix data or the IDCT matrix data in response to a DCT or IDCT selection signal provided from the outside, to transfer the data to the matrix multiplier 44.

The vector multiplier 53 within the matrix multiplier 44 multiplies the inputted DCT matrix data by the specific IDCT correlation coefficient in the step ST13, and the accumulator 59 accumulates matrix data multiplied. Then, in response to the inputted IDCT signal, the DCT/IDCT deciding units 65, 66 transmit the IDCT outputted from the accumulating unit 60 to each of the addition unit 67 and the deduction unit 68, to thus output inverse discrete cosine transformed (IDCT_OUTPUT) matrix data.

Such outputted matrix data is decided for its output in the output path deciding part 46, and the output path deciding part 46 inputs primarily IDC (inverse discrete cosine) transformed matrix data to the standardization and round-off part 47, under a primary IDCT state. The standardization and round-off part 47 standardizes and rounds off the primary IDC transformed matrix data inputted, in the step ST14, and then sends the data to the transpose buffer 48. The transpose buffer 48 transposes the transferred matrix data in the step ST15, to then provide it to the first multiplexer 41.

After afore-mentioned primary IDCT, the first multiplexer 41 selects the transposed matrix data and transfers the data to the pre/post scaler 42, to lead it to the inputter of the matrix multiplier 44. The matrix multiplier 44 multiplies the inputted matrix data by the specific IDCT correlation coefficient, through afore-mentioned operations, in the steps ST16, ST17. Such vector processed IDCT coefficients are stored at the accumulator 59, and the IDCT coefficient based on such operations is decided for itself output path by the output path deciding part 46, namely its output path is determined to the final standardization and round-off part 49. The final standardization and round-off part 49 standardizes and rounds off the inputted IDCT matrix data, in the step ST18, and then the data is through a buffering as a type of 8*8 block in the block buffer 50 and transmitted to a next terminal.

Meantime, the DCT coefficient processing procedure in the DCT/IDCT processor is described as follows.

The first, multiplexer 41 selects one out of the DCT coefficient and the IDCT coefficient inputted according to the external signal deciding the DCT or IDCT, and transfers it to the pre/post scaler 42. Namely under such DCT process procedure, the IDCT matrix data is selected and transmitted to the pre/post scaler 42. Also, though it is not shown in the drawings, the above external signal needs in deciding whether a corresponding logic will operate by a DCT mode or an IDCT mode, in order to actually embody the DCT/IDCT in one ASIC.

The pre/post scaler 42 multiplies the transferred IDCT coefficient by a prescaling correlation coefficient in the step ST11, and its prescaled IDCT matrix data is inputted to the second multiplexer 43, and the second multiplexer 43 inducts the prescaled matrix data to a next terminal, namely the inputter of the matrix multiplier 44.

The vector multiplier 53 within the matrix multiplier 44 multiplies the inputted IDCT matrix data by the specific DCT correlation coefficient in the step ST13, and the accumulator 59 accumulates matrix data multiplied. Then, in response to the inputted DCT signal, the DCT/IDCT deciding units 65, 66 transmit the DCT matrix data outputted from the accumulating unit 60 to each of the addition unit 67 and the deduction unit 68, to thus output discrete cosine transformed (DCT_OUTPUT) matrix data.

Such outputted matrix data is decided for its output in the output path deciding part 46, and the output path deciding part 46 inputs primarily discrete-cosine transformed matrix data to the standardization and round-off part 47, under a primary DCT state. The standardization and round-off part 47 standardizes and rounds off the primarily discrete-cosine transformed matrix data inputted, in the step ST14, and then sends the data to the transpose buffer 48. The transpose buffer 48 transposes the transferred matrix data in the step ST15, to then provide it to the first multiplexer 41.

After afore-mentioned primary DCT, the first multiplexer 41 selects the transposed matrix data and leads the data to the inputter of the matrix multiplier 44. The matrix multiplier 44 multiplies the inputted matrix data by the specific DCT correlation coefficient, through afore-mentioned operations, in the steps ST16, ST17. Such vector processed DCT coefficients are stored at the accumulator 59, and the DCT coefficient based on such operations is decided for itself output path by the output path deciding part 46, namely its output path is determined to the final standardization and round-off part 49. The final standardization and round-off part 49 standardizes and rounds off the inputted DCT matrix data, in the step ST18, and then the data is through the buffering as a type of 8*8 block in the block buffer 50 and transmitted to a next terminal.

Operations in the matrix multiplier 44 are described more in detail as follows.

In the numerical expression 8, odd values $F_{1,3,5,7}$ and even values $F_{0,2,4,6}$ on a given input row, as a pair type, enter the data path every each clock cycle. In order to use a symmetric nature in the specific IDCT correlation coefficient matrix, the data path is divided into the odd channel 51 and the even channel 52. The fixed positional multiplier 55 multiplies an input sample by a correlation coefficient not '1' provided on the correlation coefficient matrix of [Table 1], to whereby generate a series of multiplication values inputted to the crossbar switches 57, 58. It is desirable to use a 4:4 crossbar switch having input values A–D and output values E–H, as the crossbar switch 57, and it is also essential to construct four 4:1 multiplexers. As the crossbar switch 58, it is desirable to use a 2:4 crossbar switch having the inputter I, J and the outputter K–N, and four multiplexers are constructed essentially. The crossbar switches 57, 58 have such function as specific input values are mapped to specific output values.

Figure 6:
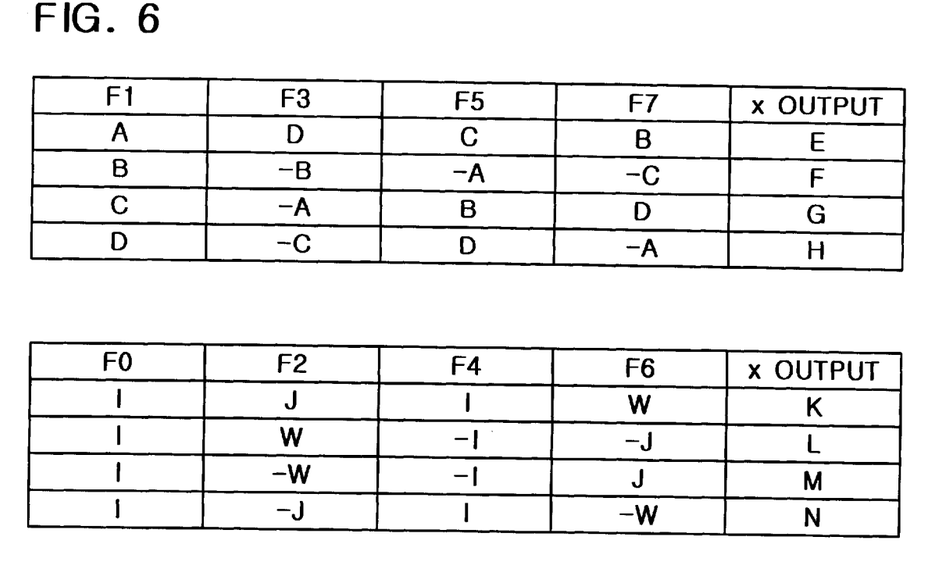
FIG. 6 provides a diagram showing an output state of a multiplexer in an IDCT performance of FIG. 4.
Figure 7:
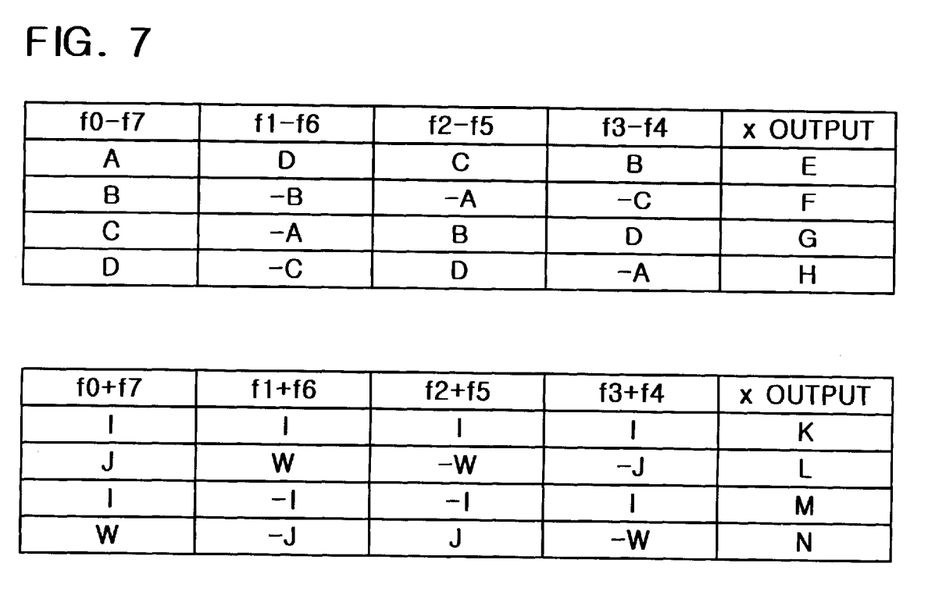
FIG. 7 furnishes a diagram showing an output state of a multiplexer in a DCT performance of FIG. 4.

FIG. 6 is a diagram providing output values of the multiplexer in the IDCT Performance, and FIG. 7 provides output values of the multiplexer in the DCT execution. The addition unit 67 generates first four values on a clock matrix, and the deduction unit 68 generates final four values thereon. The addition unit 67 and the deduction unit 68 generate one different value among values gained during each cycle of four cycles by adding up the sum of multiplication values and values of FIGS. 6, 7. Accumulator output values contained in the register 56 are effective during any one cycle among four cycles since the accumulator stores the intermediate sum during initial three cycles. The accumulating unit 60 connected with outputs E and K of the crossbar switches 57, 58 is used during a clock period in which the output is effective, accordingly, its additional register does not need to be equipped.

It can be easily noted to those skilled in the art that FIGS. 6 and 7 are as matrixes of [Table 3] and represent a system multiplied by a single row vector. The addition unit 67 and the deduction unit 68 operate in parallel. In the matrix characteristic of [Table 3] it can be calculated only by ten carry look ahead adder, the crossbar switches 57, 58, the multiplexers 63, 64 and the DCT/IDCT deciding units, wherein ten carry look ahead adder includes twenty-five registers 54,56,61,62,69, four fixed positional multipliers, the accumulating unit 60, the addition unit 67 and the deduction unit 68.

As afore-mentioned, in accordance with the present invention, a rapid and effective DCT and IDCT can be achieved, and DCT and IDCT are embodied in one ASIC. Further, the number of the total calculation is reduced to whereby improve a process speed of DCT and IDCT, and the number of fixed-point multiplication calculation is lessened, to thereby develop a correctness and effectively apply the invention to a voice and image information process in which information should be processed by a real time.

It will be apparent to those skilled in the art that various modifications and variations can be made in the DCT/IDCT processor of the present invention without deviating from the spirit or scope of the invention. Thus, it is intended that the present invention cover the modifications and variations of this invention provided they come within the scope of the appended claims and their equivalents.

What is claimed is:

1. An inverse discrete cosine transform processor, for use of a discrete cosine transform/inverse discrete cosine transform (DCT/IDCT) processor, having standardization and round-off means for standardizing and rounding off discrete-cosine transformed matrix data, a transpose buffer for transposing the matrix data outputted from the standardization and round-off means, and final standardization and round-off means for standardizing and rounding off finally inverse-discrete cosine transformed matrix data, said processor comprising:

first data selection means for selecting and outputting one out of said matrix data and matrix data transposed by said transpose buffer;

a first pre/post scaler for prescaling or postscaling the matrix data outputted from the first data selection means;

second data selection means for selecting one out of a DCT coefficient and an IDCT coefficient in response to an external signal deciding a DCT and an IDCT, and outputting the coefficient as the matrix data;

a matrix multiplier for multiplying the matrix data provided from said second data selection means by DCT or IDCT correlation coefficients selectively, accumulating its result matrixes, and controlling a path of discrete-cosine transformed or inverse-discrete cosine transformed matrix data in response to the external signal deciding the DCT and the IDCT;

a second pre/post scaler for prescaling or postscaling the matrix data outputted from the matrix multiplier, and transferring the data to said first data selection means; and output path deciding means for deciding an output path of the matrix data outputted from the matrix multiplier.

2. The processor of claim 1, wherein said first data selection means is constructed by multiplexers for selecting and outputting one out of the matrix data inputted according to the signal and the matrix data transposed in the transpose buffer, said signal being for deciding the DCT and the IDCT.

3. The processor of claim 2, wherein said second data selection means is constructed by first and second selection switches, which select and output one out of the DCT coefficient and the IDCT coefficient in response to the signal deciding the DCT and the IDCT.

4. The processor of claim 1, wherein said matrix multiplier comprises:

a vector multiplier having a plurality of registers and a fixed positional multiplier, for executing a vector multiplication;

an accumulator for accumulating matrixes outputted from said vector multiplier; and crossbar switches positioned between said vector multiplier and said accumulator, for interfacing the matrix data between the vector multiplier and the accumulator.

5. The processor of claim 4, wherein said accumulator comprises:

an accumulating unit;

a plurality of registers;

a multiplexer for multiplexing output data from a plurality of registers;

a DCT/IDCT deciding unit for controlling a path between an output provided from said multiplexer and the DCT coefficients inputted from the outside; and an addition and deduction unit for selectively adding up and deducting output signals of said DCT/IDCT deciding unit.

6. The processor of claim 5, wherein said DCT/IDCT deciding unit outputs the DCT coefficients provided from the accumulating unit, if a DCT signal is not inputted thereto, and transfers the inputted DCT coefficients to each of said addition unit and the deduction unit, if the DCT signal is inputted from the outside.

7. The processor of claim 5, wherein said DCT/IDCT deciding unit sends IDCT coefficients to each of said addition unit and the deduction unit so that the inverse-discrete cosine transformed data is outputted, if the IDCT coefficients are outputted from said accumulating unit.

8. The processor of claim 1, wherein said second pre/post scaler comprises first and second matrix selecting scalers for selecting one out of DCT matrix data outputted from said matrix multiplier and IDCT matrix data inputted to other inputter, and prescaling or postscaling the selected matrix data.

9. The processor of claim 8, wherein said first matrix selecting scaler comprises:

a multiplexer for selecting one out of the DCT matrix data outputted from a first DCT/IDCT deciding unit and the IDCT matrix data inputted to other inputter, said first DCT/IDCT deciding unit being positioned within the matrix multiplier;

a pre/post scaler for prescaling or postscaling output matrixes from said multiplexer; and a demultiplexer for demultiplexing the matrix data outputted from said pre/post scaler.

10. The processor of claim 8, wherein said second matrix selecting scaler comprises:

a multiplexer for selecting one out of the DCT matrix data outputted from a second DCT/IDCT deciding unit and the IDCT matrix data inputted to other inputter, said second DCT/IDCT deciding unit being positioned within the matrix multiplier;

a pre/post scaler for prescaling or postscaling the output matrixes from said multiplexer; and a demultiplexer for demultiplexing the matrix data outputted from said pre/post scaler.

* * * * *